Patented Apr. 14, 1970

3,506,717
TETRAALKYL-1,3-CYCLOBUTANEDITHIOLS
Edward U. Elam and Herman E. Davis, Kingsport, Tenn., assignors to Eastman Kodak Company, Rochester, N.Y., a corporation of New Jersey
No Drawing. Filed Mar. 20, 1967, Ser. No. 624,237
Int. Cl. C07c *149/26;* C08g *51/66*
U.S. Cl. 260—609                                           4 Claims

ABSTRACT OF THE DISCLOSURE

Cyclobutanedithiols of the formula

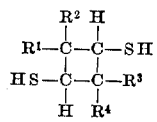

wherein $R^1$, $R^2$, $R^3$ and $R^4$, taken singly, are lower alkyl or

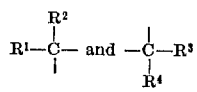

are carbocyclic rings containing from 4 to 6 carbon atoms. The cyclobutanedithiols are useful in photochromic compositions and are prepared by reduction of the corresponding cyclobutanedithiones.

---

This invention relates to certain substituted 1,3-cyclobutanedithiols as novel compositions of matter and to methods for preparing such compounds from the corresponding substituted 1,3-cyclobutanedithiones.

An object of this invention is to provide, as novel compositions of matter, substituted 1,3-cyclobutanedithiols.

Another object is to provide methods for preparing substituted 1,3-cyclobutanedithiols.

These and other objects are attained by the practice of this invention which comprises the reduction of a substituted 1,3-cyclobutanedithione by catalytic hydrogenation or by chemical reduction, in the absence of a solvent or in an inert solvent, and recovering the dithiols by any suitable method, such as by crystallization or distillation.

More specifically, the dithiols are obtained by the reduction of a substituted 1,3-cyclobutanedithione having the formula

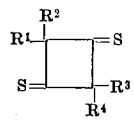

to provide a compound having the formula:

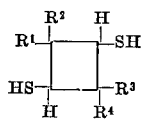

wherein $R^1$, $R^2$, $R^3$ and $R^4$, when taken singly, are lower alkyl groups containing form 1 to 4 carbon atoms; the substituents $R^1$ and $R^2$, when taken collectively with the carbon atom to which they are attached, from a carbocyclic ring containing from 4 to 6 carbon atoms and the substituents $R^3$ and $R^4$, when taken collectively with the carbon atom to which they are attached, form a carbocyclic ring having from 4 to 6 carbon atoms.

The reduction may be accomplished by catalytic hydrogenation or by chemical reduction. Suitable reducing agents which may be used in the chemical reduction include sodium borohydride, or sodium or aluminum amalgam. Others will be apparent to those skilled in the art The reduction reaction may be performed in a suitable inert solvent system. Suitable solvents include alcohols such as isopropyl alcohol, and cyclic ethers, such as tetrahydrofuran.

The reaction is exothermic and accordingly it is not necessary to supply additional heat. However, it is preferred to keep the solution at a temperature from about 35° C. to about 95° C. during the addition of the chemical reducing agent.

The dithiols of the invention may be isolated from the reaction mixture by any suitable method, such as crystallization or distillation.

The products of this invention are useful chemical intermediates. Mercaptans or thiols may be employed as antioxidants and inhibitors for polymerization control, as pesticides, as components of flotation agents, as components of extreme pressure lubricants, and as agent for improving the color of transparent optical plastic materials such as used in the lenses of sunglasses.

The following examples illustrate the best modes of carrying out this invention.

EXAMPLE 1

A solution of 2,2,4,4-tetramethyl-1,3-cyclobutanedithione (34.4 g.) in isopropyl alchol (150 ml.) is added slowly to a stirred solution of sodium borohydride (8.5 g.) in water (50 ml.) The reaction is exothermic and the mixture begins to reflux. When the reaction is complete, the complex which formed is hydrolyzed by adding concentrated hydrochloric acid (100 ml.) diluted with water (200 ml.). The mixture is cooled and extracted with two 100 ml. portions of ethyl ether. The extract is washed with water and dried. A semisolid mass which remains after the ether has been removed is recrystallized once from methanol to give 12 g. of a light yellow waxy solid, M.P. 86–90° C. It is a mixture of cis- (80%) and trans- (20%) 2,2,4,4-tetramethyl-1,3-cyclobutanedithiol as determined by nuclear magnetic resonance spectroscopy.

*Analysis.*—Calcd. for $C_8H_{16}S_2$ (percent): C, 54.99; H, 9.15; S, 36.37. Found (percent): C, 54.37; H, 9.14; S, 36.41.

The following equation represents the reaction that took place.

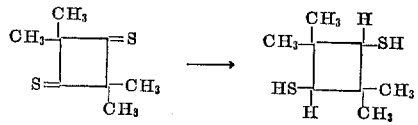

EXAMPLE 2

Under the general conditions of Example 1, 2,4-dibutyl-2,4-diethyl-1,3-cyclobutanedithione gives 2,4-dibutyl-2,4-diethyl-cyclobutanedithiol. The following equation illustrates this reaction.

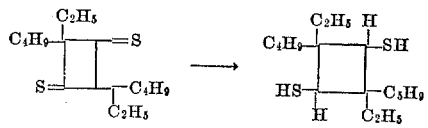

EXAMPLE 3

A solution of dispiro[5.1.5.1]tetradecan-7,14-dithione (12.5 g., 0.05 mole) in tetrahydrofuran (70 ml.) is added slowly to a stirred solution of sodium borohydride (4 g.; 0.1 mole) in water (10 ml.). The temperature is kept at 50–60° C. during the addition. The pale yellow organic layer is evaporated to dryness and there remains 12 g. of a viscous yellow liquid which does not crystallize on hilling. It is distilled to give 7.5 g. of a mixture of cis and trans dispiro[5.1.5.1]tetradecan - 7,14 - dithiol, B.P. 131–32° C./0.5 mm., $n_D^{20}$ 1.5640. The following equation represents this reaction.

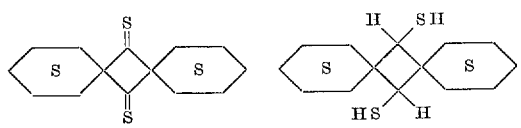

EXAMPLE 4

This example illustrates the catalytic hydrogenation of tetramethyl - 1,3 - cyclobutanedithione, using a sulfur-resistant catalyst.

A mixture of 43 g. of 2,2,4,4-tetramethyl-1,3-cyclobutanedithione, 100 ml. of cyclohexane, and 15 g. of cobalt polysulfide is charged to an autoclave. Hydrogen pressure is built up to 1500 p.s.i. and the autoclave then heated to 150° C. This pressure and temperature are maintained until no further pressure drop occurs. The catalyst is removed and the solvent evaporated to give 25 g. of crude product which is recrystallized from methanol to give pure 2,2,4,4-tetramethyl-1,3-cyclobutanedithiol.

EXAMPLE 5

This example illustrates the utility of the compounds of this invention in photochromic plastic compositions. A plastic composition composed of cellulose acetate butyrate to which about 0.05% of mercury dithizonate [bis (diphenylthiocarbazano)mercury] has been added has a reddish-orange color which warkens reversibly on exposure to sunlight or ultraviolet light. Although the photochromic behavior makes this composition of interest for use in sun glasses, for example, the reddish-orange color is esthetically objectionable. It has been found that addition of a small amount of 2,2,4,4-tetramethyl-1,3-cyclobutanedithiol to this composition changes the color from reddish-orange to a pleasing bluish-green which is much more desirable for use in sun glasses. The photochromic properties of the plastic are otherwise unchanged. The following method is suitable for preparing plastic films containing this additive.

An acetone solution is prepared which contains cellulose acetate butyrate and about 0.05%, based on the cellulose ester, of mercury dithizonate. A trace of 2,2,4,4-tetramethyl-1,3-cyclobutanedithiol is added to this solution. There is an immediate color change from reddish-orange to light green. A film cast from this solution has a light blue green color which darkens markedly on exposure to light. When this film is placed in the dark, the color fades. The color of this film, both before and after exposure to light, is much more esthetically pleasing than the color of similar film which does not contain the dithiol.

The certain substituted cyclobutanedithiones which are used in this invention may be obtained by reacting a substituted 1,3-cyclobutanedione having the formula

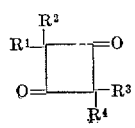

with phosphorus pentasulfide to provide a compound having the formula

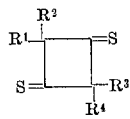

wherein the substituents $R^1$, $R^2$, $R^3$ and $R^4$ have the meaning given above.

Although the invention has been described in considerable details with particular reference to certain preferred embodiments thereof, variations and modifications can be effected within the spirit and scope of the invention as described hereinbefore.

We claim:

1. A compound having the formula

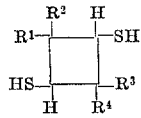

wherein the substituents $R^1$, $R^2$, $R^3$ and $R^4$, when taken singly, are lower alkyl groups containing from 1 to 4 carbon atoms; the substituents $R^1$ and $R^2$, when taken collectively with the carbon atom to which they are attached, form a carbocyclic ring containing from 4 to 6 carbon atoms and the substituents $R^3$ and $R^4$, when taken collectively with the carbon atom to which they are attached, form a carbocyclic ring having from 4 to 6 carbon atoms.

2. A compound as defined in claim 1 having the formula

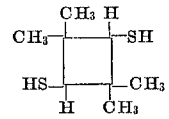

3. A compound as defined in claim 1 having the formula

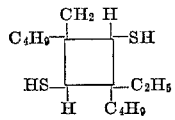

4. A compound as defined in claim 1 having the formula

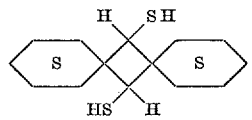

References Cited

UNITED STATES PATENTS 3,297,765    1/1967    Lipscomb _____ 260—607

OTHER REFERENCES

Reid: "Chemistry of Bivalent Sulfur," vol. III (1960), pp. 166–167.

CHARLES B. PARKER, Primary Examiner

D. R. PHILLIPS, Assistant Examiner

U.S. Cl. X.R.

8—4; 210—44; 252—406, 45; 260—607, 999, 37